(12) United States Patent
Martin et al.

(10) Patent No.: US 11,277,731 B2
(45) Date of Patent: Mar. 15, 2022

(54) APPARATUS AND METHOD FOR A MOBILE TELECOMMUNICATIONS SYSTEM

(71) Applicant: Sony Corporation, Tokyo (JP)

(72) Inventors: Brian Alexander Martin, Basingstoke (GB); Shin Horng Wong, Basingstoke (GB); Martin Warwick Beale, Basingstoke (GB); Yuxin Wei, Basingstoke (GB); Vivek Sharma, Basingstoke (GB); Shinichiro Tsuda, Basingstoke (GB); Hideji Wakabayashi, Basingstoke (GB); Samuel Asangbeng Atungsiri, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 216 days.

(21) Appl. No.: 16/481,831

(22) PCT Filed: Feb. 1, 2018

(86) PCT No.: PCT/EP2018/052489
§ 371 (c)(1),
(2) Date: Jul. 30, 2019

(87) PCT Pub. No.: WO2018/141833
PCT Pub. Date: Aug. 9, 2018

(65) Prior Publication Data
US 2020/0068379 A1 Feb. 27, 2020

(30) Foreign Application Priority Data
Feb. 3, 2017 (EP) .................................. 17154636

(51) Int. Cl.
*H04W 8/00* (2009.01)
*H04W 76/14* (2018.01)
(Continued)

(52) U.S. Cl.
CPC ............. *H04W 8/005* (2013.01); *H04W 8/26* (2013.01); *H04W 72/042* (2013.01); *H04W 74/0833* (2013.01); *H04W 76/14* (2018.02)

(58) Field of Classification Search
None
See application file for complete search history.

(56) References Cited

U.S. PATENT DOCUMENTS 9,467,164 B2 10/2016 Ionita et al.
2011/0287743 A1* 11/2011 Hu ......................... H04L 67/16
455/411

(Continued)

FOREIGN PATENT DOCUMENTS

EP 2986039 A1 2/2016
WO 2018/114258 A1 6/2018

OTHER PUBLICATIONS

International Search Report and Written Opinion dated May 16, 2018 for PCT/EP2018/052489 filed on Feb. 1, 2018, 16 pages.

(Continued)

*Primary Examiner* — Alex Skripnikov
(74) *Attorney, Agent, or Firm* — Xsensus LLP

(57) ABSTRACT

An apparatus comprising circuitry configured to generate a user equipment identifier which is unique on Anchor cell level or which is unique in RAN notified area level.

22 Claims, 11 Drawing Sheets

(51) Int. Cl.
*H04W 8/26* (2009.01)
*H04W 72/04* (2009.01)
*H04W 74/08* (2009.01)

(56) References Cited

U.S. PATENT DOCUMENTS

| | | |
|---|---|---|
| 2015/0026543 A1 | 1/2015 | Li et al. |
| 2015/0181549 A1* | 6/2015 | Batada .................... G01S 5/14 455/456.1 |
| 2015/0333775 A1 | 11/2015 | Korb et al. |
| 2017/0111878 A1* | 4/2017 | Wang .................... H04W 60/00 |
| 2018/0048418 A1* | 2/2018 | Ge .......................... H04L 1/0046 |

OTHER PUBLICATIONS

Alcatel-Lucent, "Content of message 3", 3GPP TSG RAN WG2 #59BIS, R2-074338, Oct. 8-12, 2007, Shanghai, China, 5 pages.

Ericsson et al., "Extending S-RNTI", 3GPP TSG RAN WG3 Meeting No. 75, R3-120324, Dresden, Germany, Feb. 6-10, 2012, pp. 1-3.

NTT DOCOMO Inc., "C-RNTI Length in LTE", 3GPP TSG-RAN WG2 #55, R2-062923, Seoul, Korea, Oct. 9-13, 2006, 3 pages.

3GPP, "3rd Generation Partnership Project; Technical Specification Group Core Network and Terminals; Numbering, addressing and identification", 3GPP TS 23.003 V14.2.0, Release 14, Dec. 2016, pp. 1-105.

Huawei et al., "Polar codes—encoding and decoding", 3GPP TSG RAN WG1 Meeting #xx R1-164039, Nanjing, China, May 23-27, 2016, 7 pages.

AT&T, "Design of Polar Codes for Control Channel in NR", 3GPP TSG RAN WG1 NR Ad-Hoc Meeting, R1-1700324, Spokane, USA, Jan. 16-20, 2017, pp. 1-3.

LTE, "Estimated peak hour loads in LTE", 3GPP TSG-RAN2 Meeting No. 56, Riga, Latvia, Nov. 6-10, 2006, R2-063631, 2 pages.

Huawei et al., "Evaluation on RAN initiated paging and MME initiated paging", 3GPP TSG-RAN WG2 Meeting No. 94, R2-163930, Nanjing, China, May 23-27, 2016, 12 pages.

Huawei et al., "Discussion on 2-step RACH Procedure", 3GPP TSG-RAN2 Meeting No. 96, R2-167588, Reno, USA, Nov. 14-18, 2016, 3 pages.

NTT DOCOMO, Inc., "Text Proposal to TR 38.804 on UE states and state transitions for NR", 3GPP TSG-RAN WG2 #96, Nov. 14-18, 2016, R2-168856 Revision of R2-168089, Reno, USA, pp. 1-4.

* cited by examiner

APPARATUS AND METHOD FOR A MOBILE TELECOMMUNICATIONS SYSTEM

CROSS-REFERENCE TO RELATED APPLICATIONS

The present application is based on PCT filing PCT/EP2018/052489, filed Feb. 1, 2018, which claims priority to EP 17154636.9, filed Feb. 3, 2017, the entire contents of each are incorporated herein by reference.

TECHNICAL FIELD

The present disclosure generally pertains to entities and user equipment of a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so called Long Term Evolution ("LTE"), which is a wireless communication technology allowing high-speed data communications for mobile phones and data terminals and which is already used for 4G mobile telecommunications systems. Other candidates for meeting the 5G requirements are termed New Radio Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project"). There exists a successor LTE-A (LTE Advanced) allowing higher data rates as the basis LTE which is also standardized under the control of 3GPP.

For the future, 3GPP plans to further develop LTE-A, such that it will be able to fulfill the technical requirements of 5G.

However, although there exist signaling techniques for the 5G technologies, it is generally desirable to improve the signaling in such technologies.

SUMMARY

According to a first aspect, the disclosure provides an apparatus comprising circuitry configured to generate a user equipment identifier which is unique on Anchor cell level or which is unique on RAN notified area level.

According to a further aspect, the disclosure provides an apparatus comprising circuitry configured to generate a composite user equipment identifier, the composite user equipment identifier comprising a first part and a second part, the first part including user equipment related identification information, and the second part including network related identification information.

According to a further aspect, the disclosure provides an apparatus comprising circuitry configured to adjust the size of a user equipment identifier to a frozen bits size.

According to a further aspect, the disclosure provides an apparatus comprising circuitry configured to adjust the transmission power in order to keep the frozen bits size constant.

According to a further aspect, the disclosure provides a method comprising generating a user equipment identifier which is unique on Anchor cell level or which is unique on RAN notified area level.

According to a further aspect, the disclosure provides a method comprising generating a composite user equipment identifier, the composite user equipment identifier comprising a first part and a second part, the first part including user equipment related identification information, and the second part including network related identification information.

According to a further aspect, the disclosure provides a method comprising obtaining a first part and a second part from a user equipment identifier, and applying the first part of the user equipment identifier for masking or unmasking of a control channel CRC.

According to a further aspect, the disclosure provides a method comprising adjusting the size of a user equipment identifier to a frozen bits size.

According to a further aspect, the disclosure provides a method comprising adjusting the transmission power in order to keep the frozen bits size constant.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
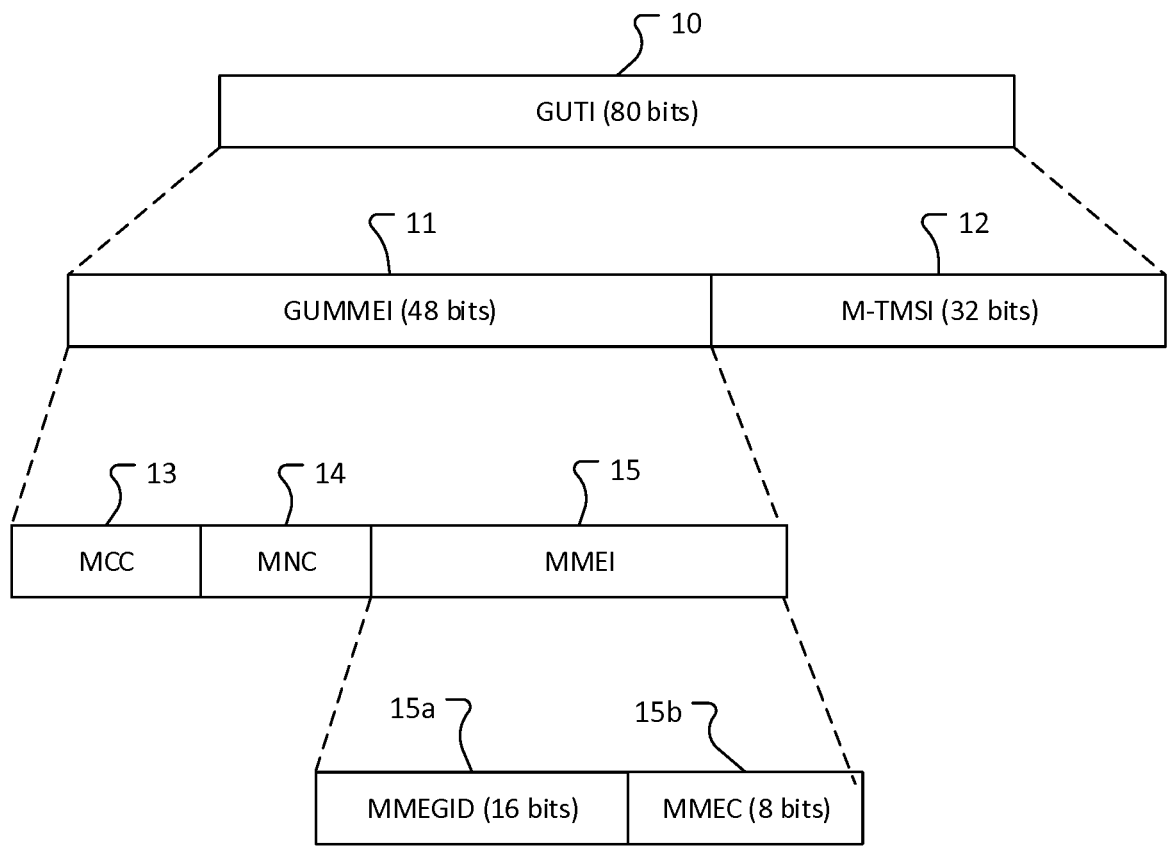
FIG. 1 shows the structure of the GUTI (Globally Unique Temporary ID) as defined in 3GPP TS 23.003.

Before a detailed description of the embodiments under reference of FIG. 1, some general explanations are made.

5G technologies will allow a concept of a so called "virtual cell" or "local cell" or the like, which may also be based on New Radio Access Technology Systems (NR). In this concept, a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short, the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

A logical separation between control plane and user plane has been achieved in accordance with the introduction of the IP Multimedia System (IMS) for LTE, and a physical separation between control plane and user plane has been proposed as a possible solution for 5G or NR. Since requirements for the control plane should be basically robustness and wide coverage so as to maintain the service continuity, a macro or anchor entity (e.g. base station or Evolved Node B) should provide a link of the control plane. On the other hand, a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE or other NR station in the function as a virtual cell, local cell, micro or pico cell, Transmission/Reception Point (TRP), small cell provided by NR eNBs, or the like should be able to take over responsibilities, which are typically handled, for example, in a base station gNB, or eNB (Evolved Node B, or eNodeB) as it is called in LTE (the eNB is the element in the evolved UTRA of LTE, the UTRA being the UMTS Terrestrial Radio Access). Such responsibilities, which are envisaged to be performed in the UE as a virtual cell or the other NR stations or entities mentioned above, are, for example, radio resource management, radio resource control (RRC), connection control, etc.

As the 5G system will be based on LTE or LTE-A, respectively, it is assumed that specific requirements of the 5G technologies will, basically, be dealt with by features and methods which are already defined in the LTE and LTE-A standard documentation.

In UMTS, and LTE and LTE-A, the concept of Radio Network Temporary Identifier (RNTI) is defined. In general, an RNTI is a kind of identification number that is used to differentiate one thing from all other similar things, e.g. to identify one specific radio channel from another radio channel or one user from another user. RNTI is for example used to scramble the CRC part of the radio channel messages. If the UE does not know the exact RNTI values for each of the cases, it cannot decode the radio channel messages even though the message reaches the UE intact.

Cell-RNTI (C-RNTI) is one exemplifying user identifier. C-RNTI is a unique identification of 16 bits in length that is used for identifying RRC Connection and scheduling which is dedicated to a particular UE. The eNB assigns different C-RNTI values to different UEs. The eNB uses C-RNTI for example to allocate a UE with uplink grants, downlink assignments, PDCCH orders etc. The eNB also uses C-RNTI to differentiate uplink transmissions (e.g. PUCCH, PUCCH) of a UE from others. C-RNTI is generated after connection establishment or re-establishment from a Temporary C-RNTI, which itself is generated as part of the Random Access procedure. For downlink data from base station to UE, downlink control information (DCI) on the control channel is transmitted. In the conventional LTE operation, blind decode of control channel is supported. DCI are transmitted on PDCCH with CRC scrambled by the C-RNTI. In LTE, C-RNTI is masked (scrambled) in PDCCH CRC part (Cyclic Redundancy Check). At receiver side, UE check CRC after de-masking of own C-RNTI. If the CRC result is OK, UE recognizes that the received control information is designated to that UE; then UE proceeds to decode the data channel. In this LTE scheme, the CRC size of control channel should be the same as C-RNTI size (16 bits).

The embodiments disclose an apparatus comprising circuitry configured to generate a user equipment identifier which is unique on Anchor cell level or which is unique on RAN notified area level.

The apparatus may be any entity of a telecommunications system, e.g. an entity of a New Radio Access Technology Systems. It may for example be a user equipment (UE), a base station gNB (or eNB), a virtual cell, a local cell, a micro or pico cell, a Transmission/Reception Point (TRP), a small cell, or the like.

An apparatus as described in the embodiments may for example be a mobile telecommunications system entity, in particular anchor entity, for a mobile telecommunications system including at least one entity serving at least one user equipment, wherein the at least one entity and the at least one user equipment are located in a common system information area, as discussed above.

The circuitry may include at least one of: processor, microprocessor, dedicated circuit, memory, storage, radio interface, wireless interface, network interface, or the like, e.g. typical electronic components which are included in a base station, such as an eNodeB.

The user equipment identifier may be of a larger size than a CRC size. For example, in LTE the CRC size of a control channel is typically 16 bits and the CRC size of a data channel may be 24 bits. According to some embodiments, the user equipment identifier may for example be of 40-bits length.

The user equipment identifier may be an extended C-RNTI. An extended C-RNTI may be a modified or extended version of a C-RNTI as it is defined in the UMTS or LTE standard.

The embodiments also disclose an apparatus comprising circuitry configured to generate a composite user equipment identifier, the composite user equipment identifier comprising a first part and a second part, the first part including user equipment related identification information, and the second part including network related identification information.

According to some embodiments, the circuitry may be configured to derive the first part of the composite user equipment identifier from all of or a part of user equipment identification information, or from a signature or random value which is generated inside a user equipment to ensure user equipment uniqueness.

According to some embodiments, the circuitry may be configured to derive the second part of the composite user equipment identifier from all or a part of a cell ID, a node ID or a network ID.

According to some embodiments, the circuitry may be configured to derive the second part of the composite user equipment identifier from a variable part of the cell ID, the node ID or the network ID. A variable part of an ID may comprise those bits which show significant variability in terms of ensuring user equipment uniqueness. In particular, the variable part of an ID may be distinguished from a fixed part of an ID which shows lower or no variability in terms of ensuring user equipment uniqueness.

According to some embodiments, the circuitry may be configured to derive the second part of the composite user equipment identifier from a Mobility Management Entity Identifier (MMEI), or from a Temporary Mobile Subscriber Entity (M-TMSI) that provides for an unambiguous identity of the UE within a particular Mobility Management Entity (MME).

According to some embodiments, the circuitry may be configured to apply a randomization process to the composite user equipment identifier. The randomization process may be a pseudo randomization process that is based on a seed. The randomization process may for example be based on a time variant key or counter, a sequence number of packets and/or on a cell ID or a network ID.

According to some embodiments, the circuitry may be configured to apply a truncation process to the composite user equipment identifier. The truncation process may for example be based on the bit size of a masking process. For example, the truncation process may be based on the bit size of a CRC masking process, e.g. to the bit size of 16 bits of a CRC masking process of a control channel.

According to some embodiments, all or parts of the composite user equipment identifier is/are applied for CRC masking.

According to some embodiments, an unused part of the composite user equipment identifier is applied as frozen bits in blind decoding. The frozen bits comprising the unused part of the composite user equipment identifier may be used in a polar coding process.

The embodiments also disclose an apparatus comprising circuitry configured to obtain a first part and a second part from a user equipment identifier, and to apply the first part of the user equipment identifier for masking or unmasking of a control channel CRC.

According to some embodiments, the circuitry may be configured to leave the second part of the user equipment identifier unused.

According to other embodiments, the circuitry may be configured to apply the second part of the user equipment identifier for masking or unmasking a data channel CRC. The first part of the user equipment identifier for masking a control channel CRC may for example be of 16-bits length and the second part of the user equipment identifier for masking data channel CRC may for example be of 24-bits length.

According to some embodiments, the circuitry may be configured to apply the second part of the user equipment identifier as frozen bits in polar coding.

According to some embodiments, the user equipment identifier is a Resume ID or an extended C-RNTI.

According to some embodiments, the circuitry may be configured to obtain the first part of the user equipment identifier from least significant bits of the user equipment identifier and to obtain the second part of the user equipment identifier from most significant bits of the user equipment identifier, or vice-versa.

According to some embodiments, the circuitry may be configured to decode the part of the extended C-RNTI which includes the higher degree of UE uniqueness and only proceed to decoding the other part of the extended C-RNTI if the CRC result of the first decoding is OK.

According to some embodiments, polar coding can be applied. In polar coding, the size of information bits may depend on the channel quality. With a polar code of code length N and information word length K, a code rate $R=K/N$ may be constructed. The polar code has flexibility of coding rate. Depending on channel quality, the frozen bit size N-K can be changed.

According to some embodiments, the circuitry may be configured to adjust the size of a user equipment identifier to a frozen bits size.

According to some embodiments, the circuitry may be configured to apply repetition or zero padding if the size of the user equipment identifier is smaller than the frozen bits size.

According to some embodiments, the circuitry may be configured to apply puncturing or truncation if the size of the user equipment identifier is larger than the frozen bits size.

According to some embodiments, the circuitry may be configured to split the user equipment identifier into two parts and to use one of the parts as frozen bits and the other part for CRC masking.

According to some embodiments, the circuitry may be configured to adjust the size of a user equipment identifier to a varying frozen bits size.

The embodiments also disclose an apparatus comprising circuitry configured to adjust the transmission power in order to keep the frozen bits size constant.

The embodiments also disclose a method comprising generating a user equipment identifier which is unique on Anchor cell level or which is unique on RAN notified area level.

The embodiments also disclose a method comprising generating a composite user equipment identifier, the composite user equipment identifier comprising a first part and a second part, the first part including user equipment related identification information, and the second part including network related identification information.

The embodiments also disclose a method comprising obtaining a first part and a second part from a user equipment identifier, and applying the first part of the user equipment identifier for masking or unmasking of a control channel CRC. The method may comprise any processes as defined with regard to the circuitry described above.

The embodiments also disclose a method comprising adjusting the size of a user equipment identifier to a frozen bits size. The method may comprise any processes as defined with regard to the circuitry described above.

The embodiments also disclose a method comprising adjusting the transmission power in order to keep the frozen bits size constant. The method may comprise any processes as defined with regard to the circuitry described above.

The embodiments also disclose a computer program comprising program code causing a computer to perform the method as defined above when being carried out on a computer.

The embodiments also disclose a non-transitory computer-readable recording medium that stores therein a computer program product, which, when executed by a processor, causes the method as defined above to be performed.

Large UE-IDs

In NR, larger UE-ID may be required. For example, in RRC Inactive State Paging for downlink transmission, a larger UE-ID (e.g. extended C-RNTI) size (larger than 16 bits) may be required. However, larger CRC size (larger than 16 bits) seems unsuitable for control channel because of overhead compared to small payload size.

The embodiments described below in more detail provide methods and respective circuitry to deal with larger UE-ID, e.g. with an extended C-RNTI that is larger than 16 bits.

In NR, for example, alternative identifiers other than C-RNTI could be used in idle state or inactive state. Possible alternative IDs have been disclosed in R2-167588 [1] (see Table 2). These IDs are likely to be of larger size than conventional C-RNTI size (16 bits). For example, UE-ID in NarrowBand IoT (NB-IoT) inactive state (resume ID) may have 40 bits.

There are a number of original IDs that can be used to construct a large UE-ID. For example, IDs that may be used to construct a large UE-ID are S-TMSI/RandomValue, Resume ID, shortMAC-I, M-TMSI (MME-TMSI), GUTI (Globally Unique Temporary ID), IMSI, or the like.

Also network node IDs may be used as original IDs in constructing a large UE-ID. For example, Cell ID/Node ID such as Physical cell ID (PCI), ECI (E-UTRAN Cell Identifier) such as eNB ID or cell id, ECGI (E-UTRAN Cell Global Identifier), MCC (Mobile Country Code)+MNC (Mobile Network Code)+the ECI (E-UTRAN Cell Identifier), GUMMEI (Globally Unique MME Identifier), Beam IDs or Preamble signatures might be used.

Composite UE-ID Generation from Original IDs

FIG. 1 shows the structure of the GUTI (Globally Unique Temporary ID) as defined in 3GPP TS 23.003 [2]. The GUTI provides an unambiguous identification of the UE that does not reveal the UE or the user's permanent identity in the Evolved Packet System (EPS). Still further, it also allows the identification of the MME and network. As shown in FIG. 1, the GUTI 10 consists of GUMMEI 11 and M-TMSI 12. GUMMEI 11 uniquely identifies the Mobile Management Entity (MME). M-TMSI (a Temporary Mobile Subscriber Identity that provides for an unambiguous identity of the UE within a particular MME) 12 is of 32-bits length and uniquely identifies the UE within the MME. GUMMEI 11 comprises Mobile Country Code (MCC) 13, Mobile Network Code (MNC) 14 and MME Identifier (MMEI) 15. MCC 13 identifies uniquely the country of domicile of the mobile subscriber. MNC 14 consists of two or three digits for GSM/UMTS applications. The MNC identifies the home PLMN of the mobile subscriber. The length of the MNC (two or three digits) depends on the value of the MCC. MME Code shall be of 8-bits length. MMEI 15 is constructed from an MME Group ID (MMEGI) 15a of 16-bits length and an MME Code (MMEC) 15b of 8-bits length.

Figure 2A:
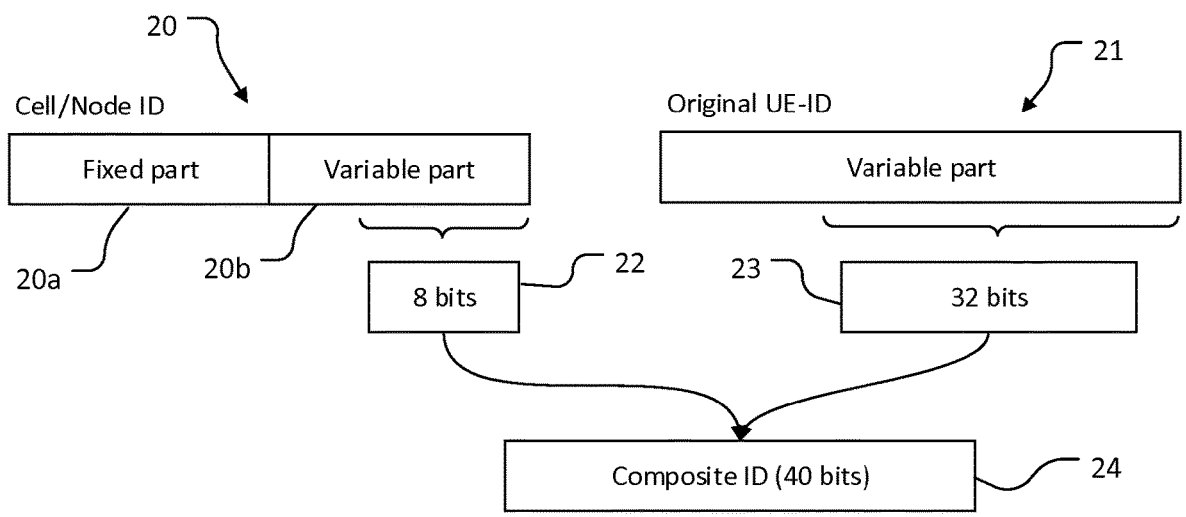
FIGS. 2a, b and c show embodiments of constructing a composite ID, respectively a new UE-ID from an original UE-ID and from a Cell/Node ID based on the assumption that some bits of original IDs are frequently changed, but some are not so frequently changed.

FIGS. 2a, b and c show embodiments of constructing a composite ID, respectively a new UE-ID from an original UE-ID 21 and from a Cell/Node ID 20 based on the assumption that some bits of original IDs are frequently changed, but some are not so frequently changed. Fixed parts of original IDs are truncated from the variable part and are combined to make a shorter composite ID. For example, if GUTI 10 (described with regard to FIG. 1 above) is used, MCC 13 and MNC 14 parts are almost of fixed value. The fixed (unchanged) part is not very suitable for constructing a UE-ID because of its redundancy and lack of uniqueness and security.

According to the embodiment of FIG. 2a, the Cell/Node ID 20 comprises a fixed part 20a and a variable part 20b. Fixed part of Cell/Node ID is truncated from the Cell/Node ID 20. An 8-bit section 22 of the variable part 20b is obtained and combined with a 32-bits section 23 of original UE-ID 21 (which is considered as a variable part) to make a composite ID 24 that comprises 40 bits. The variable part may for example be the MMEI (15 in FIG. 1) or the M-TMSI (12 in FIG. 1) of GUTI.

Figure 2B:
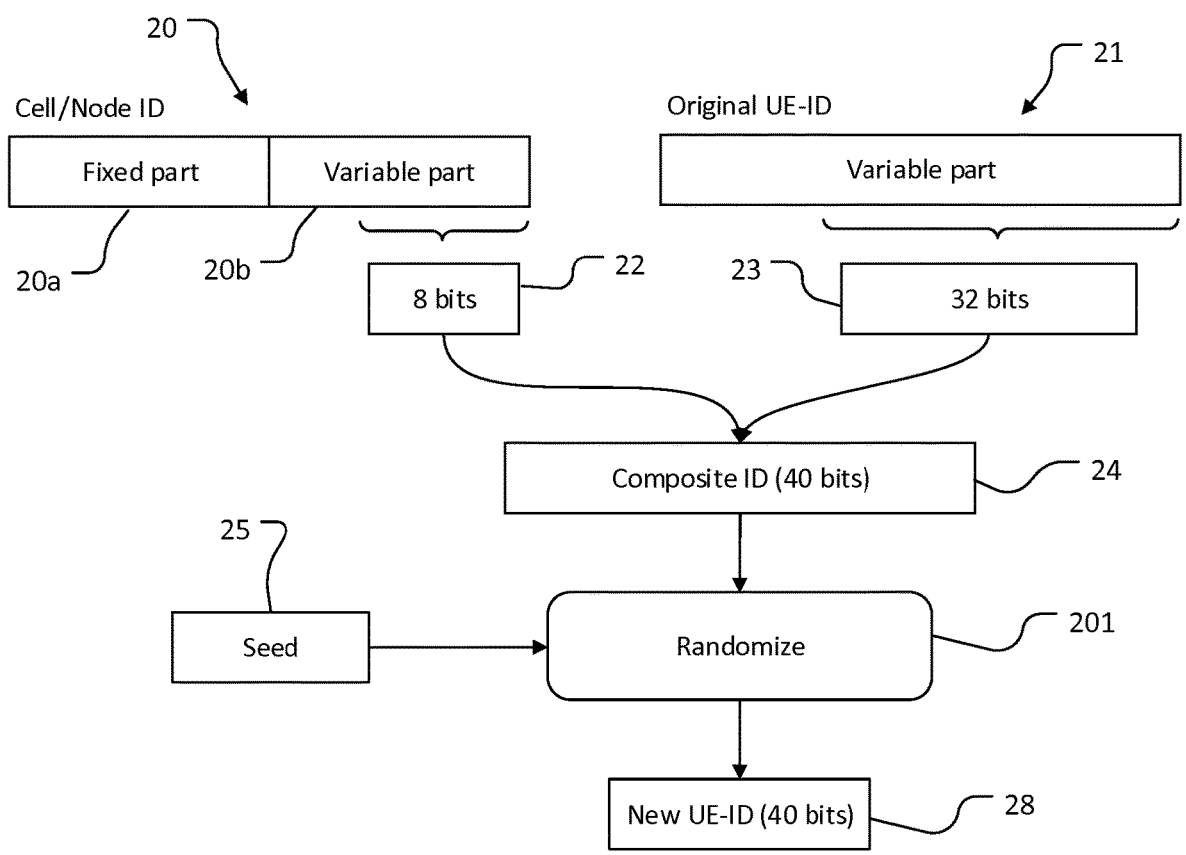

According to the embodiment of FIG. 2b, as in the embodiment of FIG. 2a, the Cell/Node ID 20 comprises a fixed part 20a and a variable part 20b. Fixed part of Cell/Node ID is truncated from the Cell/Node ID 20. An 8-bit section 22 of the variable part 20b is obtained and combined with a 32-bits section 23 of original UE-ID 21 (which is considered as a variable part) to make a composite ID 24 that comprises 40 bits. In addition, pseudo-randomization 201 is applied with a pre-defined formula based on a randomization seed 25. Randomization seed 25 may be a time variant key/counter and/or a cell ID. Randomization seed 25 is a shared value between UE and Network such as security key, System frame number (SFN), Physical cell id (PCI), or the like. As result of pseudo-randomization 201, a new UE-ID of 40-bits length is obtained. Both UE and eNodeB can derive the same ID.

Figure 2C:
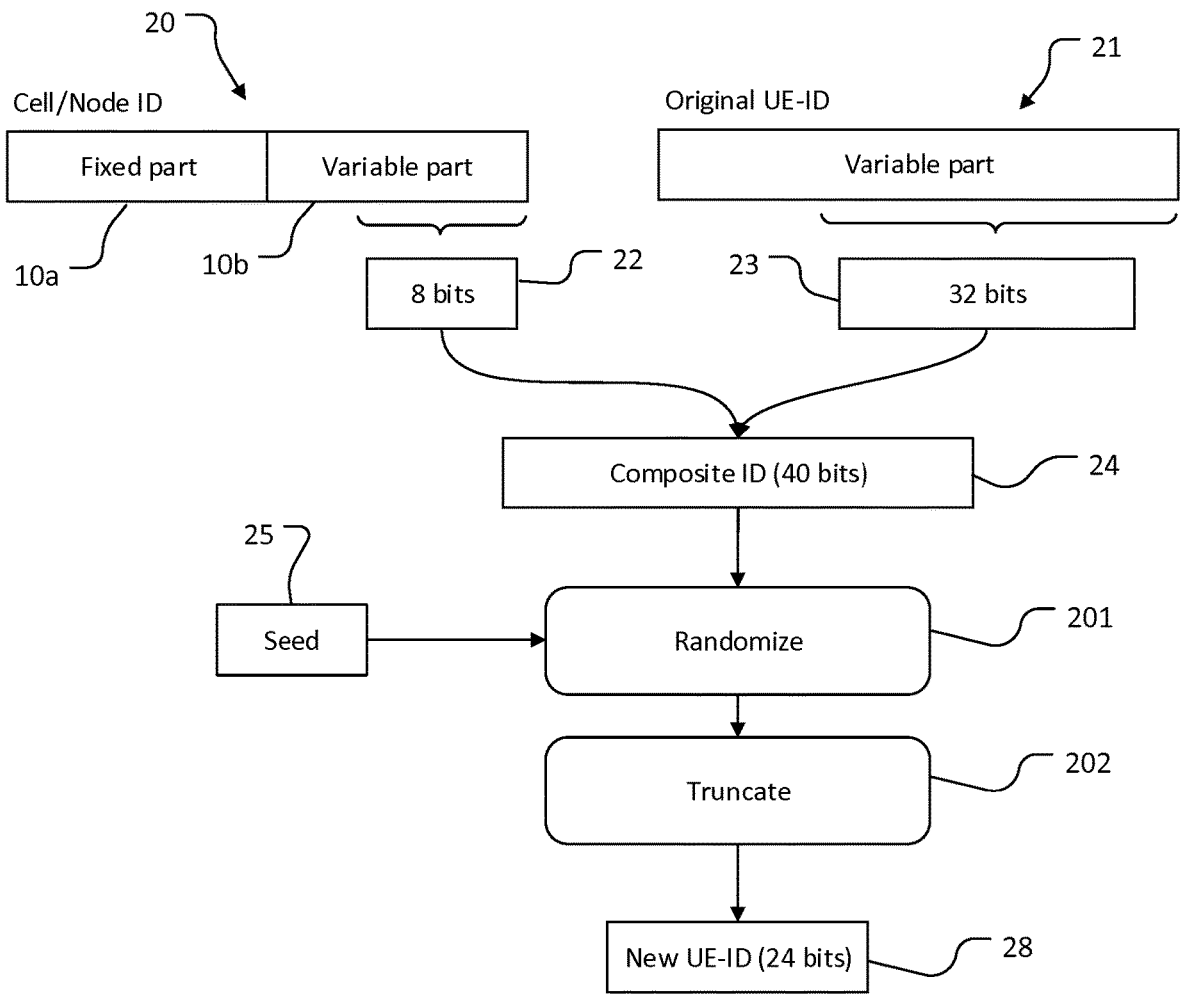

According to the embodiment of FIG. 2c, in addition to the pseudo-randomization 201 of the embodiment of FIG. 2b, a truncation 202 is applied to obtain a shorter new UE-ID of 24 bits length. This shorter new UE-ID of 24-bits length may for example be used for masking of a data channel CRC.

Further Truncated Resume ID

For NR, long IDs such as the resume identity (resume ID) are foreseen. The resume identity is used in RRC connection resume procedure to identify the suspended UE context. This helps UE identity to facilitate UE context retrieval at eNB. The resume identity (resumeID) is of 40-bits length.

In the embodiment described here, the resume identity (resume ID) is reused as UE-ID. However, the resume ID is of relatively large size (40 bits). In REL-13, a shorter version of the resume ID (called truncated resume ID, 24 bits) is introduced, but this still exceeds the control channel CRC size (16 bits).

Figure 3:
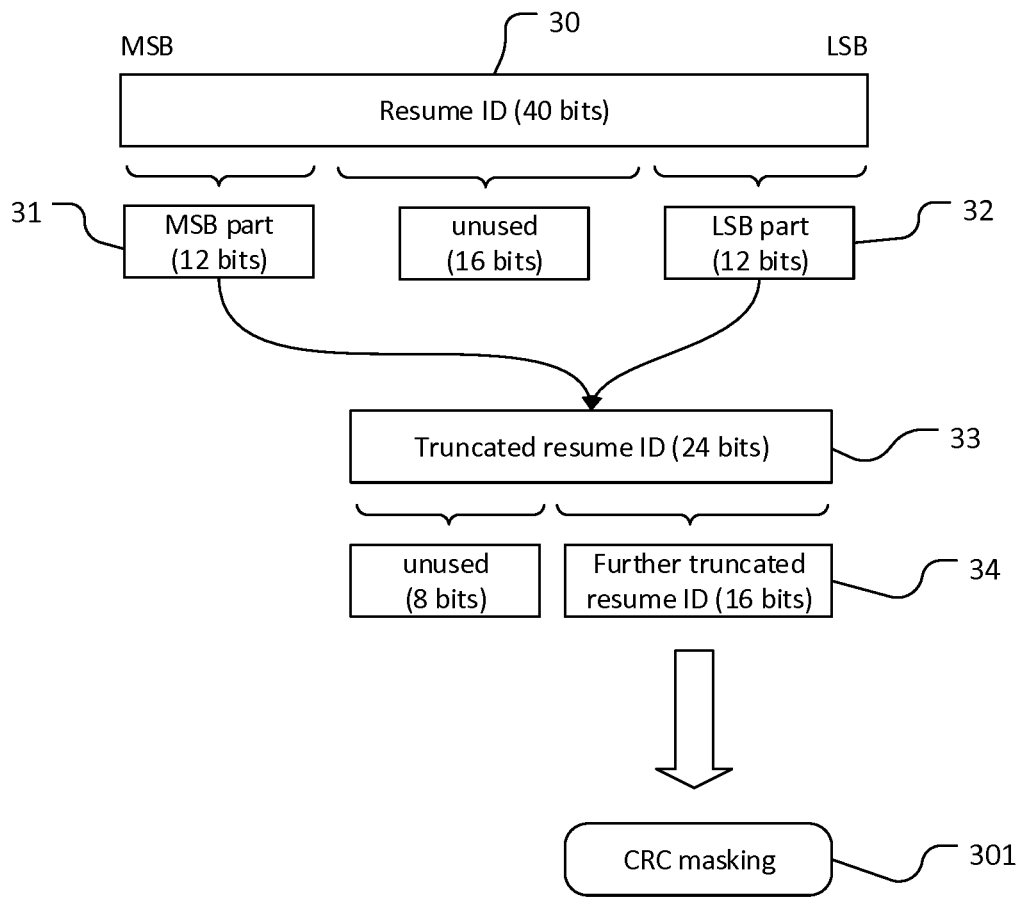
FIG. 3 shows an embodiment in which a further truncated resume ID is provided in line with control channel CRC size.

According to the embodiment of FIG. 3, a further truncated resume ID is provided in line with control channel CRC size. An MSB part 31 of 12-bits length is obtained from the MSB side (Most Significant Bits) of 40-bits resume ID 30. Still further, an LSB part 32 of 12-bits length is obtained from the LSB side (Least Significant Bits) 40-bits resume ID 30. The remaining 16 bits of resume ID 30 are not used. A truncated resume ID 33 of 24-bits length is constructed from the LSB part 32 and the MSB part 31 (e.g. by concatenation). 16 bits at the LSB side (Least Significant Bits) are used as further truncated resume ID 34 for control channel CRC masking 301. Remaining 8 bits at the MSB side are not used.

Alternatively, if polar code is applied instead of CRC as described in more detail below, the unused 8 bits could be inserted in frozen bits, as it is described below in more detail.

In the process described with regard to the embodiment of FIG. 3 a Resume ID is truncated to 16 bits. It should be noted that the same truncation process may also be applied to any large UE-ID such as obtained in the embodiments of FIGS. 2a, b, c to obtain a truncated UE-ID that may then be used for CRC-masking.

Transmission of Large UE-IDs

In the conventional LTE RACH procedure, it is possible to send a long ID on PDSCH in random access response (RAR) message, i.e. eNodeB receives the RACH preamble from UE and sends RAR to UE. In RAR, RA-RNTI is masked in control channel CRC (PDCCH) and temporary C-RNTI is inserted into the message on data channel (PDSCH). However, in two-step RACH, it is beneficial to send only small data on RAR on the data channel. Accommodation of a large size UE-ID is too redundant. Total RAR PDSCH payload may be 80-100 bits if it is followed by the conventional RAR payload design. In addition to C-RNTI, TA command and/or back-off indicator may be carried on it. As a result, there is little room to transmit the small data in RAR on the data channel if large size UE ID is used.

According to one embodiment, instead of full CRC masking, an extended C-RNTI is split into two parts and one of the two parts is used to mask control channel CRC and the other part is used to mask data channel CRC.

According to another embodiment, instead of full CRC masking, an extended C-RNTI is split into two parts and a part of it is inserted into the frozen bits of polar codes.

Splitting Extended C-RNTI into Control Part and Data Part

In conventional LTE, C-RNTI size is 16 bits. It provides enough number space because eNodeB does not have to allocate C-RNTI for idle mode LTE UEs. In an early stage of LTE discussion, 3GPP Tdoc R2-063631 [3], LS on Number of non LTE_idle UEs per cell (RAN2 #56, November 2006) showed the estimation number of UEs in active state. This showed that 16 bits was enough space to accommodate the number of active state users even at busy times. On the other hand, C-RNTI size in NR may be required to extend. This is because an NR network may accommodate a massive number of MTC terminals (e.g. 10 times that of LTE). Still further, some of UEs may keep UE-ID for a longer period in inactive state (e.g. 24 hours). Still further, a C-RNTI could be defined in a larger area such as at anchor cell level or RAN notification area level (the area for inactive state mobility) rather than at cell level. In the current 3GPP assumption, RAN notification area is one or more than one cell, and could be smaller than the tracking area (TA), which is the paging area of idle mode terminals. As a consequence, extended C-RNTI (or equivalent ID) may exceed the control channel CRC size (which is typically 16 bits).

Figure 4:
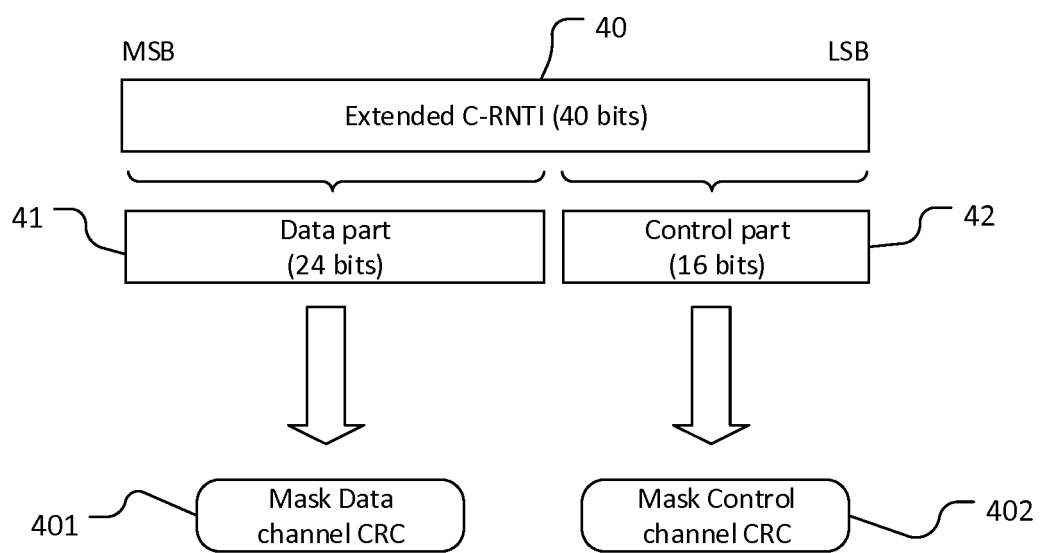
FIG. 4 shows an embodiment that provides two stage CRC masking for both control channel and data channel.

FIG. 4 shows an embodiment that provides two stage CRC masking for both control channel and data channel. An extended C-RNTI (40 bits) is separated into a data part 41 of 24-bits length and a control part 42 of 16-bits length. Data part 41 of 24-bits length is used in masking 401 data channel CRC. Control part 42 of 16-bits length is used in masking 402 control channel CRC. In general, data channel CRC size (e.g. 24 bits) is larger than control channel CRC size (e.g. 16 bits).

Figure 5:
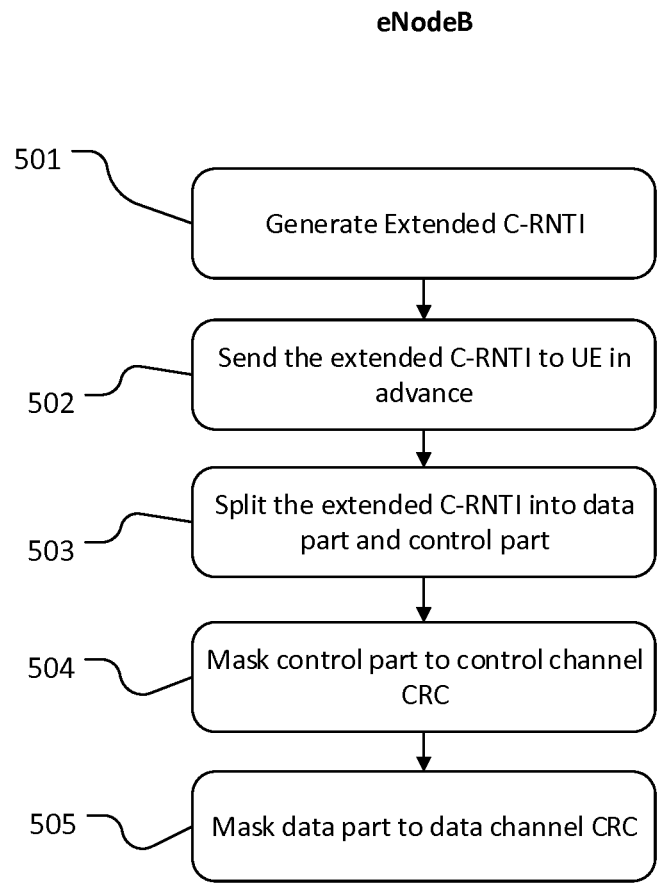
FIG. 5 shows an embodiment of a process of two stage CRC masking from the eNodeB side.

FIG. 5 shows an embodiment of a process of two stage CRC masking from the eNodeB side. At 501, eNodeB generates an extended C-RNTI. At 502, eNodeB sends the extended C-RNTI to UE in advance. This sending of the extended C-RNTI to UE may for example be performed by an inactive state paging process as set out below in more detail. At 503, eNodeB splits the extended C-RNTI into a data part and a control part. At 504, eNodeB masks the control part to control channel CRC. At 505, eNodeB masks the data part to data channel CRC.

Figure 6:
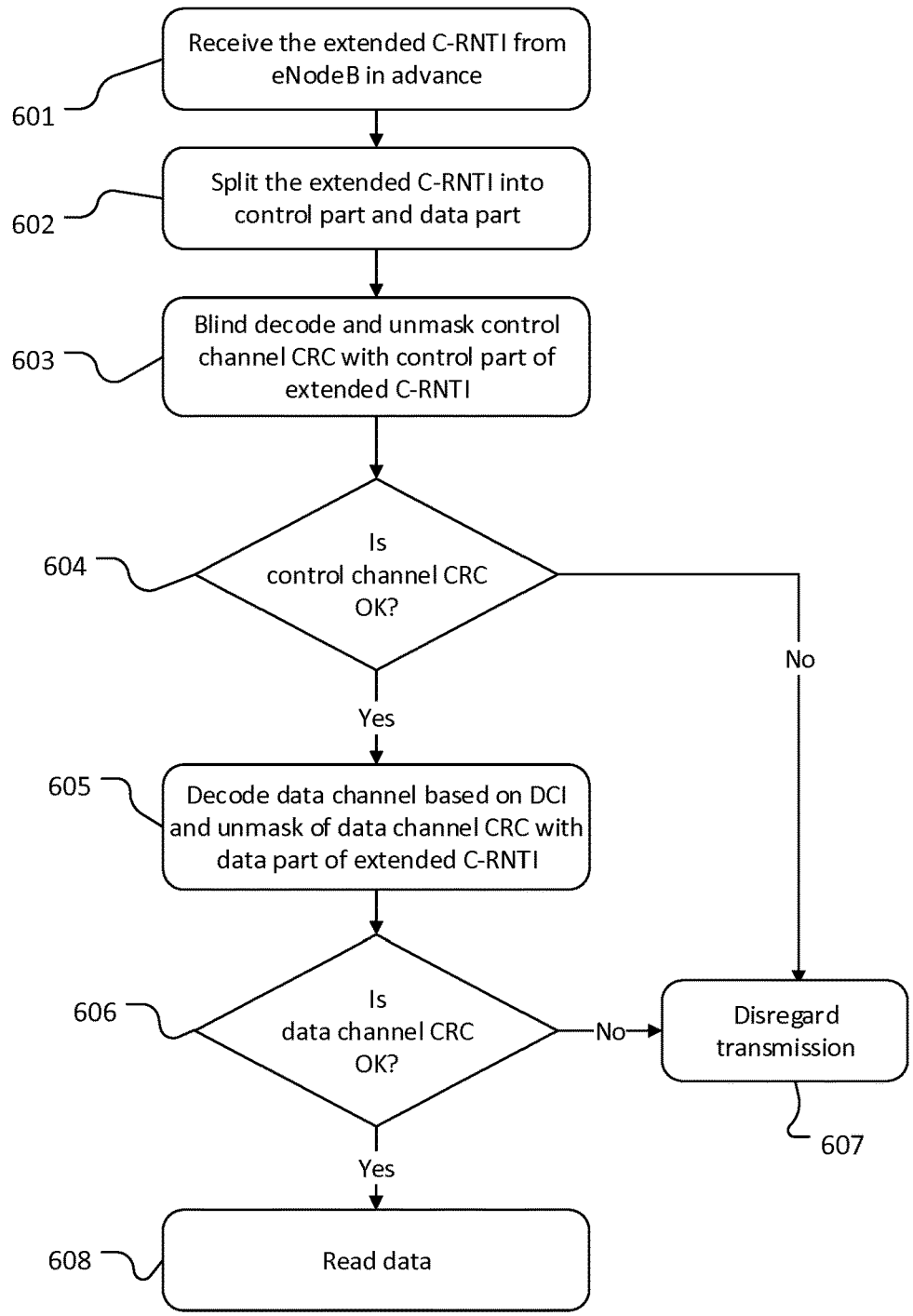
FIG. 6 shows an embodiment of a process of two stage CRC masking from the UE side.

FIG. 6 shows an embodiment of a process of two stage CRC masking from the UE side. At 601, UE receives an extended C-RNTI from eNodeB in advance. This receiving of the extended C-RNTI to UE may for example be performed by an inactive state paging process as set out below in more detail. At 602, UE splits the C-RNTI into control part and data part. At 603, UE blind decodes and unmasks the control channel CRC with the control part of the extended C-RNTI. At 604, UE checks if the control channel CRC is OK. If it is decided at 604 that the control channel CRC is OK, the process proceeds with 605 (data channel decoding). At 605, UE decodes the data channel based on DCI and unmasks the data channel CRC with the data part of the extended C-RNTI. At 606, UE checks if the data channel CRC is OK. If it is decided at 606 that the data channel CRC is OK, the process proceeds at 608. At 608 it has been confirmed that CRC of control part and data part are OK and that the data is for the designated UE. Accordingly, UE reads the data. If it is decided at 604 that the control channel CRC is not OK or if it is decided at 606 that the data channel CRC is not OK, then the process proceeds with 607. At 607, UE has confirmed that either CRC of control part or data part is not OK and that the data is therefore not for the designated UE. Accordingly, UE disregards the transmission. The UE may skip data channel decode and go to power saving.

For power saving and/or decoding processing load reduction of blind decoding, a UE may first try decoding the part of the extended C-RNTI which includes the higher degree of UE uniqueness and only proceed to decoding the other part of the extended C-RNTI if the first part CRC result is OK. In the process described with regard to the embodiment of FIG. 4 an extended C-RNTI is split into two parts and the first part of the extended C-RNTI is used for masking data channel CRC and the second part of the extended C-RNTI is used for masking control channel CRC. It should, however, be noted that the same truncation process may also be applied to any large UE-ID such as the user identifiers obtained in the embodiments of FIG. 2*a, b, c* or a Resume ID as described in the context of FIG. 3.

Polar Codes and Frozen Bits

By the embodiments described below, frozen bits of polar coding are used for a specific ID or key indication such as C-RNTI.

Using polar codes is the current 3GPP working assumption of channel encoder/decoder for downlink control channel of eMBB NR. The general principles of polar coding are set out for example in R1-164039 [3] and R1-1700324 [4]. Polar codes are based on Chain Rule for mutual Information. According to polar coding, communication channels split into reliable part and unreliable part. A data sequence to be transmitted is inserted into the reliable part and a fixed pattern is inserted into the unreliable part. This fixed pattern is called frozen bits. Typically, they are all set to zero, but any number is fine unless the bits in UE are different from that in eNB. Both, the encoder and the receiver decoder know the frozen bits (fixed values, typically all zero) and frozen set (the position of frozen bits). The coding rate is flexible based on the size of frozen bits (and the size of information bits). Polar coding can be used with a CRC-like conventional way (such as in LTE).

Polar coding can be performed by means of an encoder for polar coding as it is known to the skilled person, for example from US 2015/03337775. According to such an encoder, N channels split into two parts, K channels for information bits and N-K channels for frozen bits. According to the embodiments described below, the frozen bits are used to indicate (parts of) a UE-ID, like the C-RNTI or parts of an extend C-RNTI. Information bits are inserted in the reliable part of polar coding. In addition, C-RNTI is inserted into the unreliable part (frozen bits) instead of setting all frozen bits to zero. Preferably, both UE and eNB know which values are used in advance.

FIGS. 7*a-f* show different mappings between C-RNTI and frozen bits that may be applied depending on the size of C-RNTI.

Figure 7A:
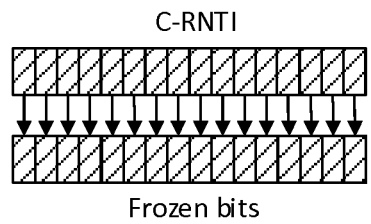
FIGS. 7a-f show different mappings between C-RNTI and frozen bits that may be applied depending on the size of C-RNTI.

According to the embodiment of FIG. 7*a*, the size of extended C-RNTI matches the size of frozen bits and a one-to-one mapping between C-RNTI bits and frozen bits is applied.

Figure 7B:
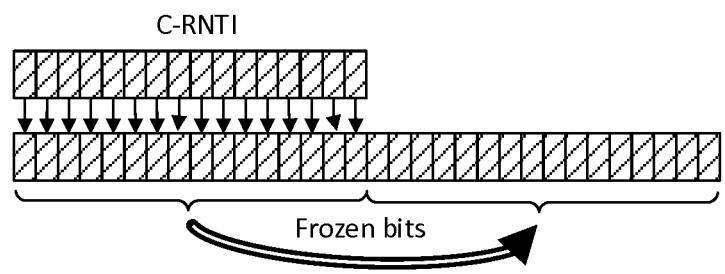

According to the embodiment of FIG. 7*b*, the size of extended C-RNTI is smaller than that of the frozen bits and the mapping is based on repetition. Here, for example, the size of the C-RNTI is 16 bits, the size of frozen bits is 32 bits, and a two-time repetition is applied.

Figure 7C:
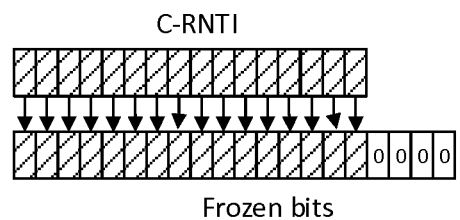

According to the embodiment of FIG. 7c, the size of extended C-RNTI is smaller than that of the frozen bits and the mapping is based on padding. For example, the size of C-RNTI is 16 bits, the size of the frozen bits is 20 bits, and an additional four zeros are inserted to frozen bits to fill the gap.

Figure 7D:
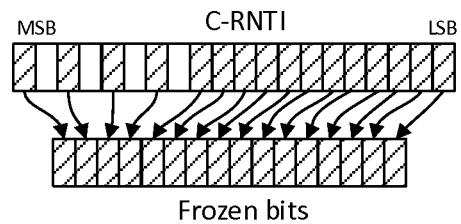

According to the embodiment of FIG. 7d, the size of extended C-RNTI is larger than that of the frozen bits and the mapping is based on puncturing. For example, every x bit is removed. In the example of FIG. 7d, C-RNTI is of 20 bits length and every second bit is removed from C-RNTI, starting from the MSB side, until the bit length 16 of the frozen bits are achieved. I.e. according to this embodiment, the extended C-RNTI is punctured in the fixed part, and as many as possible of the bits in the variable part are maintained to minimize the impact on the reliability of the ID (assuming that the bit with more variability are located at the LSB part of the extended C-RNTI). Despite the fact that there is an information loss in this embodiment, the frozen bits may still carry sufficient information so that the punctured C-RNTI despite being less reliable can still be used for identification purposes.

Figure 7E:
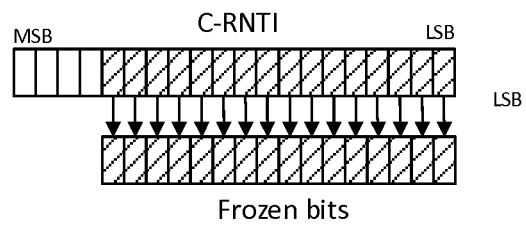

According to the embodiment of FIG. 7e, the size of extended C-RNTI is larger than that of the frozen bits and the mapping is based on truncation. For example, the part of bits at MSB side is removed.

Figure 7F:
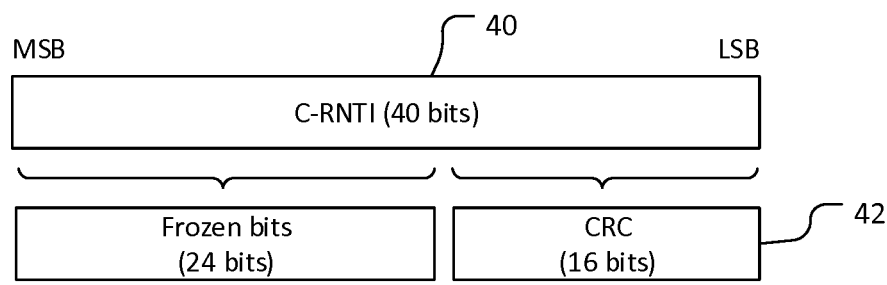

According to the embodiment of FIG. 7f the size of extended C-RNTI is larger than that of the frozen bits and the mapping is based on splitting C-RNTI into two parts. For example, C-RNTI=40 bits, the size of frozen bits=24 bits, CRC size is 16 bits. C-RNTI is split into two parts, then masking part 1 (frozen bits) and part 2 (CRC).

Fixed Frozen Bits Size and Power Control

The size of information bits depends on the channel quality. With a polar code of code length N and information word length K, a code rate R=K/N is constructed. The polar code has flexibility of coding rate. Depending on channel quality, the frozen bit size N-K can be changed. When channel quality is too good, the size of information bits can be increased (and the size of frozen bits is decreased accordingly).

However, in some embodiments it is preferable to use fixed size frozen bits when UE-ID is inserted, because the frozen bit size should be known at decoder in advance.

In such a case, according to a first embodiment, the size of frozen bits is fixed in line with UE-ID size and the transmission power of control channel is adjusted (reduced Tx power from base station) depending on channel quality.

According to another embodiment, instead of power reduction, the puncturing of information bits is effected in a similar way. A puncturing method such as described in R1-164039 [3] can be used.

Inactive State Paging

Larger UE-ID such as disclosed above may be required in NR for example in RRC Inactive State Paging for downlink transmission.

RRC Inactive State Paging is a modified RRC mode in which the UE is not in an active RRC connected mode with the radio access network (RAN), but is considered to be RRC connected from a CN (core network) point of view, so that data can be sent without CN-level paging, but with paging performed instead at the RAN level, to cause/trigger the UE to resume RRC connection (enter an RRC connected mode). This modified RRC state may be referred to as an "RRC connected inactive" state and may have characteristics as discussed in R2-168856 [5]. This approach has the benefit of being able to allow the UE to enter a more power efficient state while reducing the signalling between the CN and the RAN. The overall procedure allows RAN to take over responsibility for paging the UE, effectively hiding the RRC state transitions and mobility from the CN, and the CN therefore may directly send data as if the UE was still connected and in the same cell.

Much like conventional paging procedures at the CN level, paging procedures at the RAN level may be associated with a RAN notification area corresponding to the CN tracking area concept. That is to say, the base stations (or other TRPs) supporting the RAN in a network may be notionally divided into groups of base stations comprising respective RAN notification areas. A terminal device leaving an RAN paging notification area may be configured to inform/update the network of it changing location in much the same way as a terminal device leaving a conventional tracking area transmits a tracking area update. For ease of explanation, it is assumed for the example discussed here that the RAN notification areas correspond with the CN level tracking areas of the network, and in that sense the terminology notification area and tracking area may be used interchangeably.

However, it will be appreciated that there is no need for the RAN level notification areas/tracking areas to correspond in size and arrangement with the CN level tracking areas, and in fact it may be expected in practice that the RAN level notification areas will typically be smaller (i.e. comprise fewer base stations) than the CN level paging areas (i.e. what are referred to as tracking areas in LTE terminology), and furthermore may be terminal device specific. However, the relative sizes of, and the degree of correspondence between, the RAN level notification areas and the CN level paging areas are not significant.

Thus, from the RAN point of view, an "anchor" eNB (e.g. the last eNB the UE was connected to) may be defined, which stores the UE context information. When the CN attempts to transmit data to the UE, the RAN then attempts to page the UE on the anchor eNB, and if there is no response, the paging may then be performed on all of the cells in the tracking area/RAN notification area, in order to locate the UE. A summary of this approach may be found in R2-163930 [6]. It will be appreciated that there are various aspects of the specific paging procedure that may be adopted, for example in terms of whether the anchor base station should instruct other base stations in the RAN tracking/notification area to attempt to page the terminal device at the same time as the anchor base station pages the terminal device or only after failing to successfully page the terminal device, that will depend on the implementation at hand, and are not significant here.

The overall procedure in the RAN part of the network, from a terminal device's point of view, may be similar to the suspend/resume procedure introduced in Release 13 of the 3GPP standards for "Internet of Things" terminal devices. Thus, when a terminal device connection to a base station is released, a "resume ID" is assigned to context information stored in the network for the terminal device, and when the terminal device reconnects using the "resume" procedure, the resume ID is used to locate the stored context information for the terminal device in the network.

In RRC Inactive State Paging, a paging message may comprise physical transmission resource allocation signalling addressed to a common radio network temporary identifier for paging, P-RNTI, with transmissions on the physical transmission resources indicated by the allocation signalling containing an identifier for the terminal device and an indication of the network-allocated resource, which in this example comprises a C-RNTI allocated to the terminal device. The CRNTI in this example may be selected by the base station from among the available C-RNTI having regard to the same considerations as when allocating a C-RNTI to a terminal device during a conventional RRC connection procedure, although a significant difference here is that the terminal device is allocated the C-RNTI in the paging message and not as part of an RRC connection procedure.

Implementation

In the following, an embodiment of a general purpose computer 130 is described under reference of FIG. 8. The computer 130 can be implemented such that it can basically function as any type of apparatus or entity, base station or new radio base station, transmission and reception point, or user equipment as described herein. The computer has components 131 to 140, which can form a circuitry, such as any one of the circuitries of the entities, base stations, and user equipment, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140, which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise when it functions as a base station, and user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS and LTE.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding.

Figure 8:
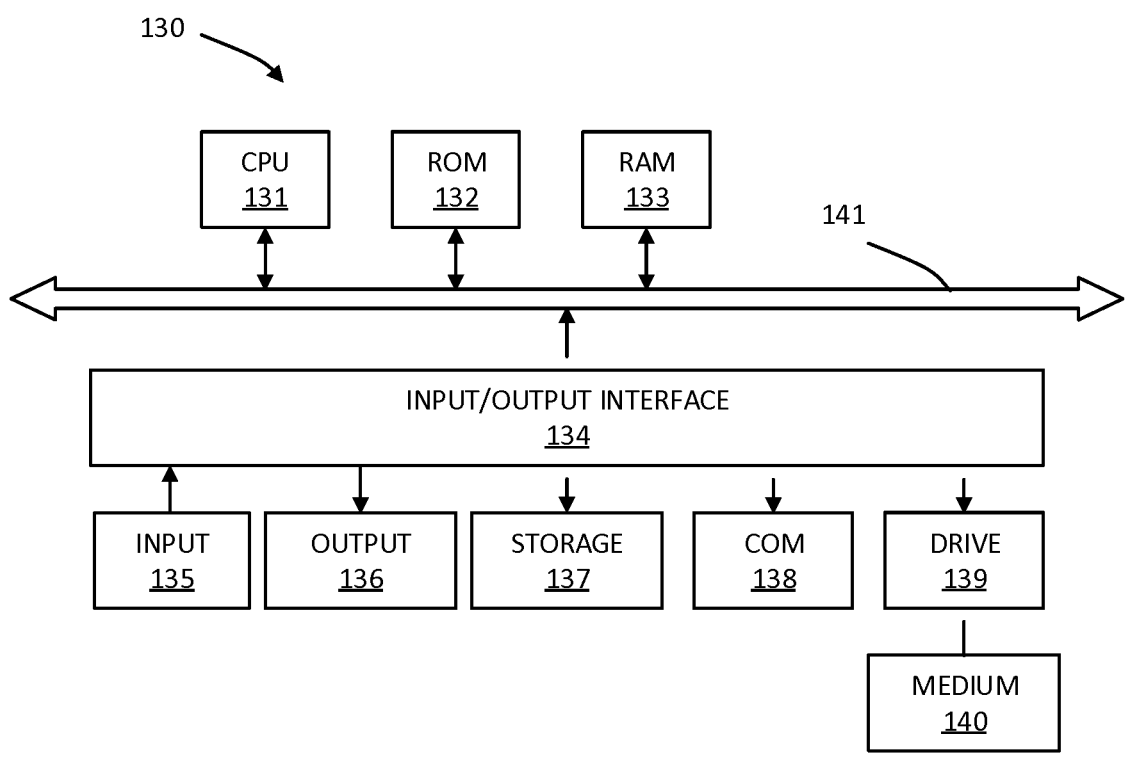
FIG. 8 shows an embodiment of a general purpose computer.

It should also be noted that the division of the control or circuitry of FIG. 8 into units 131 to 140 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An apparatus comprising circuitry configured to generate a user equipment identifier which is unique on Anchor cell level or which is unique on RAN notified area level.

(2) The apparatus of (1), wherein the user equipment identifier is of a larger size than a CRC size.

(3) The apparatus of (1) or (2), wherein the user equipment identifier is an extended C-RNTI.

(4) An apparatus comprising circuitry configured to generate a composite user equipment identifier, the composite user equipment identifier comprising a first part and a second part, the first part including user equipment related identification information, and the second part including network related identification information.

(5) The apparatus of (4), wherein the circuitry is configured to derive the first part of the composite user equipment identifier from all of or a part of user equipment identification information, or from a signature or random value which is generated inside a user equipment to ensure user equipment uniqueness.

(6) The apparatus of (4) or (5), wherein the circuitry is configured to derive the second part of the composite user equipment identifier from all or a part of a cell ID, a node ID or a network ID.

(7) The apparatus of anyone of (4) to (6), wherein the circuitry is configured to derive the second part of the composite user equipment identifier from a variable part of the cell ID, the node ID or the network ID.

(8) The apparatus of anyone of (4) to (7), wherein the circuitry is configured to derive the second part of the composite user equipment identifier from a Mobility Management Entity Identifier, or from a Temporary Mobile Subscriber Entity that provides for an unambiguous identity of the UE within a particular Mobility Management Entity.

(9) The apparatus of anyone of (4) to (8), wherein the circuitry is configured to apply a randomization process to the composite user equipment identifier.

(10) The apparatus of (9), wherein the randomization process is based on a time variant key or counter, a sequence number of packets and/or on a cell ID or a network ID.

(11) The apparatus of anyone of (4) to (10), wherein the circuitry is configured to apply a truncation process to the composite user equipment identifier.

(12) The apparatus of (11), wherein the truncation process is based on the bit size of a masking process.

(13) The apparatus of anyone of (4) to (12), wherein all or parts of the composite user equipment identifier is/are applied for CRC masking.

(14) The apparatus of anyone of (4) to (12), wherein an unused part of the composite user equipment identifier is applied as frozen bits in blind decoding.

(15) An apparatus comprising circuitry configured to obtain a first part and a second part from a user equipment identifier, and to apply the first part of the user equipment identifier for masking or unmasking of a control channel CRC.

(16) The apparatus of (15) comprising circuitry configured to leave the second part of the user equipment identifier unused.

(17) The apparatus of (15) comprising circuitry configured to apply the second part of the user equipment identifier for masking or unmasking a data channel CRC.

(18) The apparatus of (17) wherein the first part of the user equipment identifier for masking a control channel CRC is of 16-bits length and the second part of the user equipment identifier for masking data channel CRC is of 24-bits length.

(19) The apparatus of (15) comprising circuitry configured to apply the second part of the user equipment identifier as frozen bits in polar coding.

(20) The apparatus of anyone of (15) to (19) wherein the user equipment identifier is a Resume ID or an extended C-RNTI.

(21) The apparatus of (15) to (20) comprising circuitry configured to obtain the first part of the user equipment identifier from least significant bits of the user equipment identifier and to obtain the second part of the user equipment identifier from most significant bits of the user equipment identifier, or vice-versa.

(22) The apparatus of (18) comprising circuitry configured to decode the part of the extended C-RNTI which includes the higher degree of UE uniqueness and only proceed to decoding the other part of the extended C-RNTI if the CRC result of the first decoding is OK.

(23) An apparatus comprising circuitry configured to adjust the size of a user equipment identifier to a frozen bits size.

(24) The apparatus of (23) comprising circuitry configured to apply repetition or zero padding if the size of the user equipment identifier is smaller than the frozen bits size.

(25) The apparatus of (23) comprising circuitry configured to apply puncturing or truncation if the size of the user equipment identifier is larger than the frozen bits size.

(26) The apparatus of (23) comprising circuitry configured to split the user equipment identifier into two parts and to use one of the parts as frozen bits and the other part for CRC masking.

(27) The apparatus of anyone of (23) to (26) comprising circuitry configured to adjust the size of a user equipment identifier to a varying frozen bits size.

(28) An apparatus comprising circuitry configured to adjust the transmission power in order to keep the frozen bits size constant.

(29) A method comprising generating a user equipment identifier which is unique on Anchor cell level or which is unique on RAN notified area level.

(30) The method of (29), wherein the user equipment identifier is of a larger size than a CRC size.

(31) The method of (29) or (30), wherein the user equipment identifier is an extended C-RNTI.

(32) A method comprising generating a composite user equipment identifier, the composite user equipment identifier comprising a first part and a second part, the first part including user equipment related identification information, and the second part including network related identification information.

(33) The method of (32) comprising deriving the first part of the composite user equipment identifier from all of or a part of user equipment identification information, or from a signature or random value which is generated inside a user equipment to ensure user equipment uniqueness.

(34) The method of (32) or (33) comprising deriving the second part of the composite user equipment identifier from all or a part of a cell ID, a node ID or a network ID.

(35) The method of anyone of (32) to (34) comprising deriving the second part of the composite user equipment identifier from a variable part of the cell ID, the node ID or the network ID.

(36) The method of anyone of (32) to (35) comprising deriving the second part of the composite user equipment identifier from a Mobility Management Entity Identifier, or from a Temporary Mobile Subscriber Entity that provides for an unambiguous identity of the UE within a particular Mobility Management Entity.

(37) The method of anyone of (32) to (36) comprising applying a randomization process to the composite user equipment identifier.

(38) The method of (37), wherein the randomization process is based on a time variant key or counter, a sequence number of packets and/or on a cell ID or a network ID.

(39) The method of anyone of (32) to (38) comprising applying a truncation process to the composite user equipment identifier.

(40) The method of (39), wherein the truncation process is based on the bit size of a masking process.

(41) The method of anyone of (32) to (40), wherein all or parts of the composite user equipment identifier is/are applied for CRC masking.

(42) The method of anyone of (32) to (40), wherein an unused part of the composite user equipment identifier is applied as frozen bits in blind decoding.

(43) A method comprising obtaining a first part and a second part from a user equipment identifier, and applying the first part of the user equipment identifier for masking or unmasking of a control channel CRC.

(44) The method of (43) comprising leaving the second part of the user equipment identifier unused.

(45) The method of (43) comprising applying the second part of the user equipment identifier for masking or unmasking a data channel CRC.

(46) The method of (45) wherein the first part of the user equipment identifier for masking a control channel CRC is of 16-bits length and the second part of the user equipment identifier for masking data channel CRC is of 24-bits length.

(47) The method of (43) comprising applying the second part of the user equipment identifier as frozen bits in polar coding.

(48) The method of anyone of (43) to (47), wherein the user equipment identifier is a Resume ID or an extended C-RNTI.

(49) The method of anyone of (43) to (48) comprising obtaining the first part of the user equipment identifier from least significant bits of the user equipment identifier and obtaining the second part of the user equipment identifier from most significant bits of the user equipment identifier, or vice-versa.

(50) The method of (46) comprising decoding the part of the extended C-RNTI which includes the higher degree of UE uniqueness and only proceeding to decoding the other part of the extended C-RNTI if the CRC result of the first decoding is OK.

(51) A method comprising adjusting the size of a user equipment identifier to a frozen bits size.

(52) A computer program comprising program code causing a computer to perform the method according to anyone of (29) to (51) when being carried out on a computer.

(53) A non-transitory computer-readable recording medium that stores therein a computer program product, which, when executed by a processor, causes the method according to anyone of (29) to (51) to be performed.

REFERENCES

[1] 3GPP TSG-RAN2 Meeting #96, R2-167588, Reno, USA, 14-18 Nov. 2016: "Discussion on 2-step RACH Procedure"
[2] 3GPP TS 23.003, Technical Specification Group Core Network and Terminals; Numbering, addressing and identification (Release 14)
[3] 3GPP TSG RAN WG1 Meeting #85, R1-164039, Nanjing, China, May 23-27, 2016: "Polar codes—encoding and decoding"
[4] 3GPP TSG RAN WG1 NR Ad-Hoc Meeting, R1-1700324, 16-20 Jan. 2017, Spokane, USA: "Design of Polar Codes for Control Channel in NR"
[5] 3GPP TSGRAN WG2 #96, R2-168856, R2-168856, 14-18 Nov. 2016: "Text Proposal to TR 38.804 on UE states and state transitions for NR"
[6] 3GPP TSGRAN WG2 Meeting #94, R2-163930, Nanjing, China, 23-27 May, 2016: "Evaluation on RAN initiated paging and MME initiated paging"

The invention claimed is:

1. An apparatus comprising:
circuitry configured to
generate a composite user equipment identifier, the composite user equipment identifier including a first part and a second part,
derive the first part including user equipment related identification information from a variable part of an original user identification information,
derive the second part including network related identification information from a variable part of the network related identification information,
split the composite user equipment identifier into a data part and a control part,
apply the control part for CRC masking of a control channel, and
apply the data part for CRC masking of a data channel.

2. The apparatus of claim 1, wherein the network related identification information is all or a part of a cell ID, a node ID or a network ID.

3. The apparatus of claim 1, wherein the network related identification information is a cell ID, a node ID or a network ID.

4. The apparatus of claim 1, wherein the circuitry network related identification information is a Mobility Management Entity Identifier, or a Temporary Mobile Subscriber Entity that pro/ides for an unambiguous identity of the UE within a particular Mobility Management Entity.

5. The apparatus of claim 1, wherein the circuitry is configured to apply a randomization process to the composite user equipment identifier.

6. The apparatus of claim 5, wherein the randomization process is based on a time variant key or counter, a sequence number of packets and/or on a cell ID or a network ID.

7. The apparatus of claim 1, wherein the circuitry is configured to apply a truncation process to the composite user equipment identifier.

8. The apparatus of claim 7, wherein the truncation process is based on the bit size of a masking process.

9. The apparatus of claim 1, wherein an unused part of the composite user equipment identifier is applied as frozen bits in blind decoding.

10. The apparatus of claim 1, wherein the control part is shorter than the first part and longer than the second part.

11. The apparatus of claim 1, wherein the control part is shorter than the data part.

12. The apparatus of claim 1, wherein the circuitry is configured to split the composite user equipment identifier into the control part having a length in accordance with a length for CRC masking of the control channel.

13. The apparatus of claim 12, wherein the control part having the length in accordance with the length for CRC masking of the control channel is constructed from least significant hits of the composite user equipment identifier.

14. The apparatus of claim 13, wherein the control part is constructed from least significant bits of the composite user equipment identifier.

15. An apparatus comprising:
circuitry configured to
obtain a composite user equipment identifier including a first part derived from a variable part of original user identification information and a second part derived from a variable part of the network related identification information, from a user equipment identifier,
split the composite user equipment identifier into a control part and a data part,
apply the control part of the user equipment identifier for masking or unmasking of a control channel CRC, and
apply the data part of the composite user equipment identifier for masking or unmasking a data channel CRC.

16. The apparatus of claim 15, wherein the circuitry is further configured to determine if the control channel CRC is OK, and
only on condition that the control channel CRC is OK, apply the data part of the composite user equipment identifier for masking or unmasking a data channel CRC.

17. The apparatus of claim 16, wherein the circuitry is further configured to, on condition that the control channel CRC is not OK, disregard transmission.

18. The apparatus of claim 16, wherein the circuitry is further configured to
    determine if the data channel CRC is OK, and
    on condition that the control channel CRC is not OK, disregard transmission.

19. The apparatus of claim 15, wherein the control part is shorter than the first part and longer than the second part.

20. The apparatus of claim 15, wherein the control part is shorter than the data part.

21. The apparatus of claim 15, wherein the circuitry is configured to split the composite user equipment identifier into the control part having a length in accordance with a length for CRC masking of the control channel.

22. The apparatus of claim 21, wherein the control part having the length in accordance with the length for CRC masking of the control channel is constructed from least significant bits of the composite user equipment identifier.

* * * * *